Figure 6:
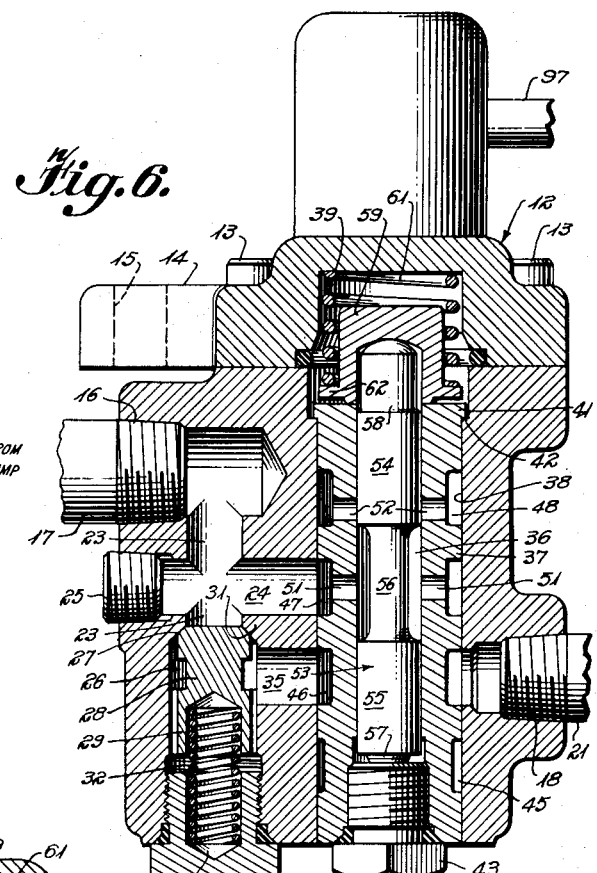

Jan. 5, 1954     F. J. STRNAD     2,664,908
UNLOADING VALVE
Filed June 21, 1950     4 Sheets-Sheet 1
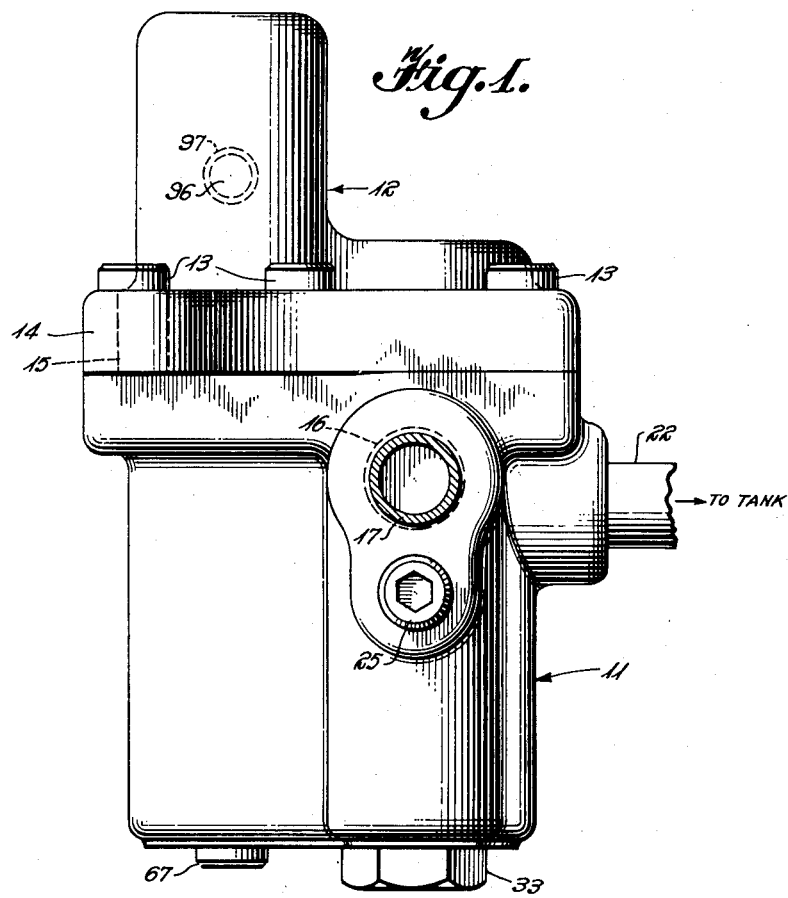
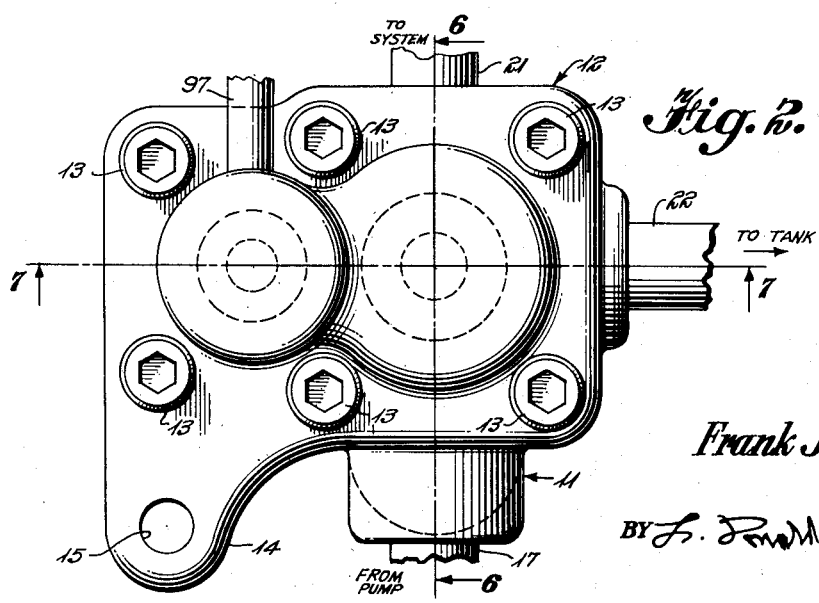
INVENTOR
*Frank J. Strnad*
BY
ATTORNEYS Jan. 5, 1954 F. J. STRNAD 2,664,908
UNLOADING VALVE
Filed June 21, 1950 4 Sheets-Sheet 2
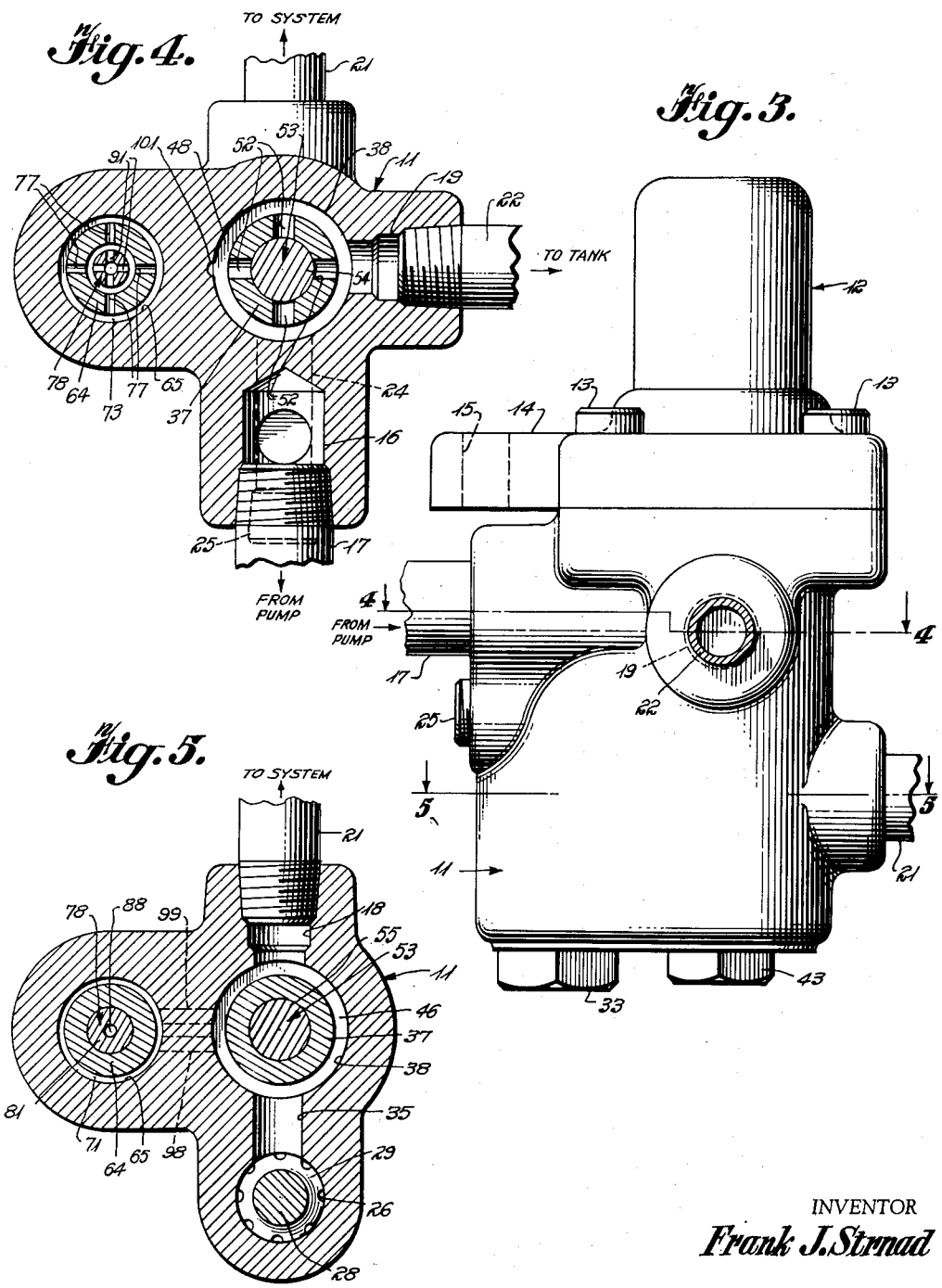
INVENTOR
*Frank J. Strnad*
BY
ATTORNEYS Jan. 5, 1954 F. J. STRNAD 2,664,908
UNLOADING VALVE
Filed June 21, 1950 4 Sheets-Sheet 3

INVENTOR
*Frank J. Strnad*
BY
ATTORNEYS

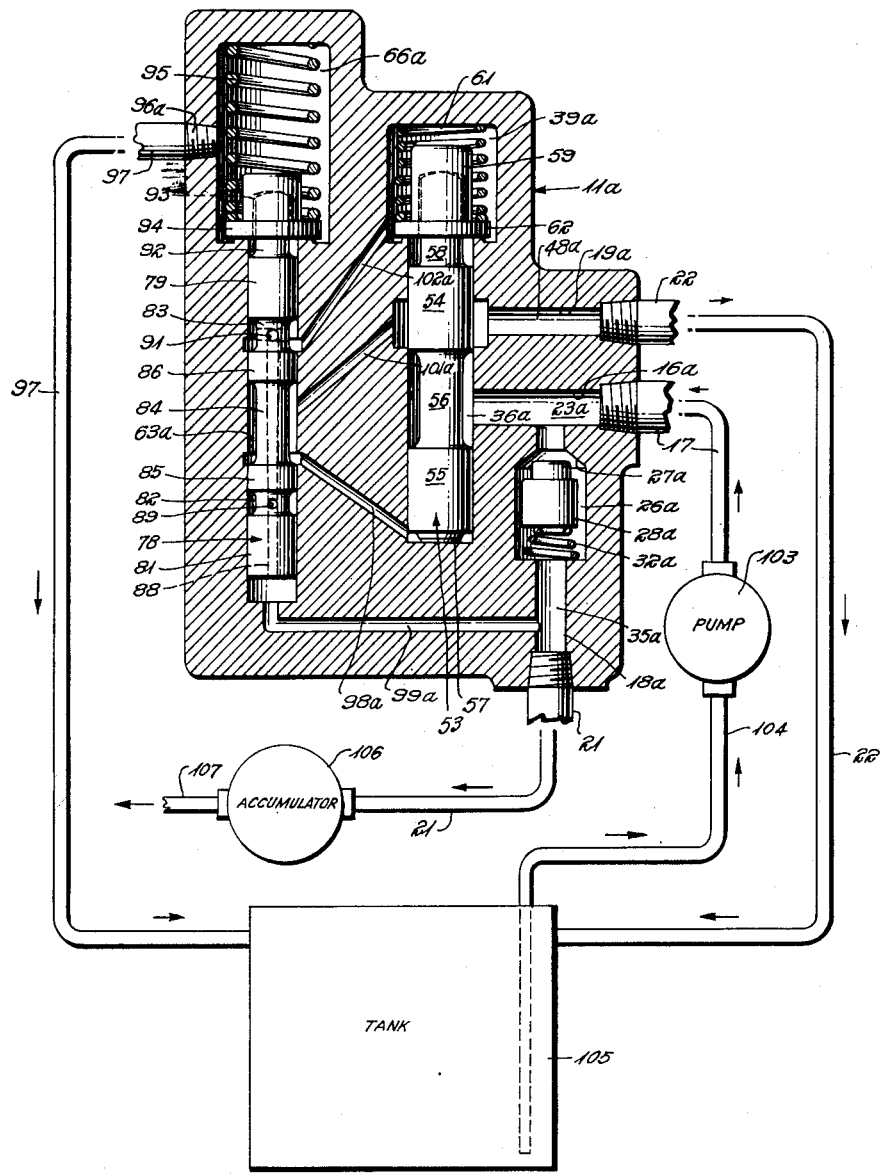

Patented Jan. 5, 1954

2,664,908

UNITED STATES PATENT OFFICE 2,664,908

UNLOADING VALVE

Frank J. Strnad, Cedar Rapids, Iowa, assignor to Link-Belt Speeder Corporation, a corporation of Illinois Application June 21, 1950, Serial No. 169,380

4 Claims. (Cl. 137—108)

1

This invention relates to new and useful improvements in pressure unloading valves for automatically controlling the flow of fluid from a pressure fluid supply source to an intermittently replenished accumulator for such fluid.

Power transmission systems of the type wherein a pressure fluid is utilized as the transmitting medium have been adapted for use in an ever-increasing number of commercial applications. This type of system offers certain advantages over mechanically operated systems, one important advantage being a substantial reduction in the number of moving parts required and the subsequent reduction in servicing and maintenance costs.

The function of an automatic unloading valve in a pressure fluid power transmission system is to determine the periods of flow of the fluid from a pump, or similar device, into the work-performing portion of the system, which usually includes an accumulator directly supplied by the pump. When, due to intermittent operation or the like, there is no need for flow of fluid to the accumulator, the unloading valve should direct the fluid from the pump back to its source, thereby relieving the pump from operation against a fluid pressure head.

In order to properly carry out the above function, it is important that the unloading valve operate, as nearly as possible, to relieve the pump of all work except when required to replenish the supply of pressure fluid to the work-performing portion of the system. Wear on the pump parts thereby is reduced and the efficiency of the system increased. It is also important that the automatic operation of the unloading valve be such as to provide a range between the pressure value at which the fluid from the pump is directed into the work-performing portion of the system and the pressure value at which the fluid is returned to its supply source. Provision of such a pressure range acts to prevent fluttering of the valve. In other words, it is undesirable for the pump to be alternately loaded and unloaded in rapid succession by the pressure against which it works as a result of slight fluctuations of the pressure in the work-performing portion of the system.

The primary objects of this invention are to provide an unloading valve for pressure fluid power transmission systems which will completely relieve the pumping device of the system of all work, except that due to pipe friction, during the periods when fluid replenishment is not required by the operation of the system, and

2 which will operate automatically to positively and rapidly control the direction of flow of the pressure fluid either to the work-performing portion of the system, when required, or to the fluid supply source, when not required, in response to fluctuations in the working pressure of the fluid in the system between given minimum and maximum values.

A further object of the invention is to provide an unloading valve having incorporated therein a fluid flow-controlling directional spool, and a pilot spool for controlling the position of the directional spool, the pilot spool being operable to determine the pressure range through which the directional spool will remain in either of its flow-controlling positions and at the opposite limits of which the pilot spool will cause the directional valve to be preloaded to effect its rapid movement into the other of said positions.

A still further object of the invention is to provide an unloading valve having incorporated therein a directional spool adapted to be positioned by the pressure of the work-performing portion of the fluid in the system in which the unloading valve is connected, independently of the pressure of the fluid delivered to the unloading valve by the pump.

Another object of the invention is the provision of an automatic unloading valve having a directional spool for controlling the flow of the fluid delivered thereto by a pump either to an accumulator or to the tank from which the pump receives its supply of fluid, said directional spool having its opposite end portions alternately subjected to the fluid pressure existing in the accumulator to shuttle the spool into the two positions which will effect the above referred to directional control of the flow of fluid.

A further object of the invention is the provision of an automatic unloading valve having a directional spool for controlling the flow of fluid delivered thereto by a pump either to an accumulator or to the tank from which the pump receives its supply of fluid, and a pilot spool for controlling the operations of the directional spool by the application of existing accumulator pressure to the opposite ends of the directional spool, the passageways providing fluid communication between the pilot spool and opposite ends of the directional spool being so arranged that either end of the directional spool is completely loaded with existing accumulator pressure before the fluid pressure on the opposite end is released to effect movement of the directional spool.

A still further object of the invention is the provision of an automatic unloading valve having a directional spool for controlling the flow of fluid delivered thereby by a pump, and a pilot spool for operating the directional spool by controlling the application of existing accumulator pressure to the opposite ends of the directional spool, the pilot valve being provided with an axially located passageway having radial ports for directing the passage of accumulator pressure to the ends of the directional valve.

A further object of the invention is the provision of an automatic unloading valve having a directional spool, and a pilot spool for controlling operation of the directional spool, the directional and pilot spools each having substantially equal surface areas at the opposite ends thereof in contact with the walls of the chambers in which they are positioned so that lapping of a true cylindrical surface without the customary taper is facilitated.

Other objects and advantages of the invention will be apparent during the course of the following description.

Figure 7:
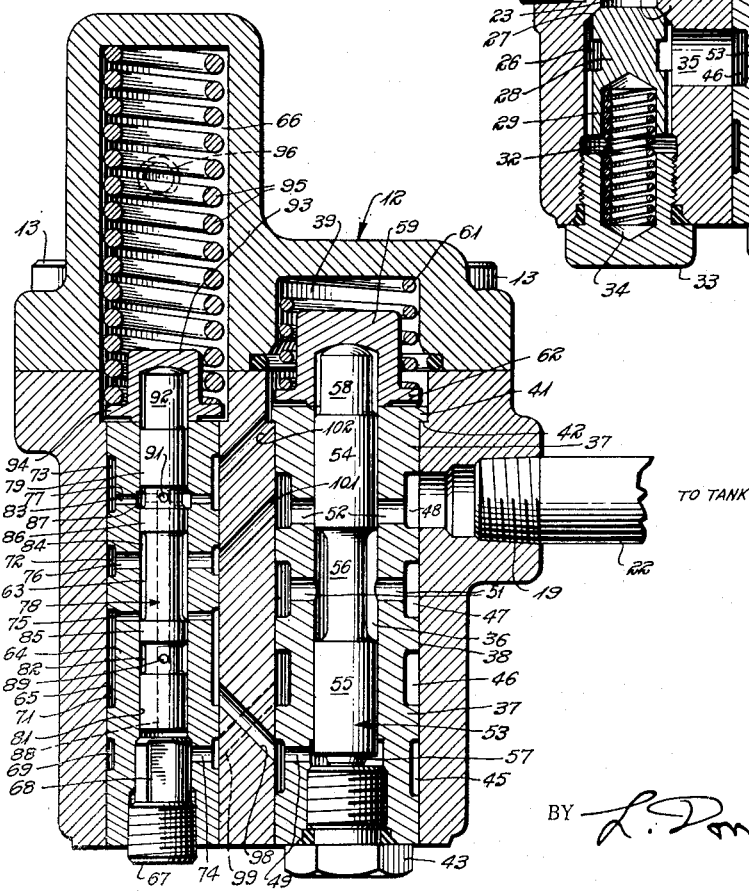

In the accompanying drawings forming a part of this specification and in which like numerals are employed to designate like parts throughout the same, Figure 1 is an elevational view of an unloading valve embodying this invention, Figure 2 is a plan view of the unloading valve illustrated in Fig. 1, Figure 3 is an elevational view of the unloading valve taken at right angles to the view of Fig. 1, Figure 4 is a horizontal sectional view taken on line 4—4 of, and turned 90 degrees with respect to, Fig. 3, Figure 5 is a horizontal sectional view taken on line 5—5 of, and turned 90 degrees with respect to, Fig. 3, Figure 6 is a vertical sectional view taken on line 6—6 of Fig. 2, Figure 7 is a vertical sectional view taken on line 7—7 of Fig. 2, and Figure 8 is a schematic sectional view of the unloading valve, and a diagrammatic representation of a pressure fluid power transmission system with which it is associated.

In the drawings, wherein for the purpose of illustration is shown a preferred embodiment of the invention, and first particularly referring to Figs. 1 to 7, inclusive, reference character 11 designates a valve body member closed at its top by a combined cap and spring housing 12 positioned in sealing engagement therewith and secured thereto by screws 13, or the like. A lug 14 extends outwardly from the cap 12 and is provided with an aperture 15 to accommodate a fastening device, not shown, for mounting the unloading valve on a suitable support. The body member 11 is provided with an inlet port 16 adapted to be threadedly connected to a pipe 17 for fluid communication with a pressure fluid supply source and a pressure outlet port 18 and a by-pass outlet port 19 adapted, respectively, to be threadedly connected to the pipes 21 and 22.

Referring now to Figs. 4 to 7, inclusive, for a detail description of the interior construction and mechanism of the unloading valve, the inlet port 16 is in open communication with a passageway 23 in the body member 11 which is intersected by a branch passage 24 that extends from the outer surface of the body member 11 to the interior of the unloading valve. The outer end portion of the branch passage 24 is sealed by the tapered plug 25. Below the branch passage 24 the passageway 23 is enlarged to form a chamber 26 having a tapered peripheral seating surface 27 at its upper end.

A check valve 28 is positioned in the chamber 26 and is provided with a fluted guide 29 to direct its movements toward and away from the seating surface 27. The upper edge 31 of the check valve member 28 is adapted to engage the seating surface 27 in sealing relationship. A compression spring 32 urges the check valve 28 into sealing contact with the seating surface 27. The outer end of the chamber 26 is sealed by a cap screw 33 which is provided with a depression 34 for receiving and guiding the spring 32.

A second branch passage 35 extends inwardly from the chamber 26 for communication with the outlet port 18 through means which will be described later.

A directional spool chamber 36 is formed in the stationary sleeve 37 which is press fitted in a bore 38 in the body member 11. Above the upper end of the chamber 36 the cap 12 is formed with a chamber 39. The upper end portion of the sleeve 37 is provided with a positioning shoulder 41 for engaging an offset 42 in the bore 38. The lower end portion of the sleeve 37 is closed and sealed against leakage by cap screw 43.

The periphery of the sleeve 37 is provided with a series of longitudinally spaced annular grooves 45, 46, 47 and 48. The groove 45 is provided with a port 49 communicating with the adjacent end portion of the directional spool chamber 36. The groove 46 connects the inner end of the branch passage 35 to the pressure outlet port 18 and does not communicate with the directional spool chamber 36. The groove 47 is in radial alinement with the inner end of the branch passage 24 and is provided with ports 51 connecting the groove 47 to the central portion of the directional spool chamber 36. The groove 48 is in open communication with the by-pass outlet port 19 and is provided with ports 52 connecting the groove with the directional spool chamber 36.

A directional spool 53 is positioned in the directional spool chamber 36 for axial movement relative thereto. The upper end portion 54 and the lower end portion 55 of the spool 53 are of equal length and are closely fitted in the chamber 36 to provide sealing engagement with the sleeve 37. The central portion 56 of the spool 53 is of reduced diameter to permit free communication through the ports 51 between the groove 47 and the directional spool chamber 36 throughout the entire range of movement of the directional spool 53. A projection 57 on the lower end of the directional spool 56 contacts the cap screw 43 to limit downward movement of the spool. At the upper end of the directional spool 53, a projection 58 extends into the chamber 39 of the spring housing 12. A hollow cap 59 is positioned over the projection 58 in chamber 39 and is engaged by the spring 61 which is compressed between the flange 62 of the cap and the top wall of the chamber 39. When the directional spool 56 is in its lowermost position, the cap 59 rests on the top of the sleeve 37. Upward movement of the directional spool causes a corresponding movement of the cap 59 to further compress the spring 61. Contact of the cap 59 and the top of chamber 39 will limit upward movement of the directional spool.

Referring now to Figs. 6 and 7, it will be appreciated that port 49 will provide constant communication between groove 45 and the lower end portion of the directional spool chamber 36 and that ports 51 and groove 47 will provide constant communication between branch passage 24 and the central portion of the directional spool chamber 36 throughout the range of movement of the directional spool 53. The ports 52 and groove 48, however, provide communication between the by-pass outlet port 49 and the central portion of the directional spool chamber 36 only when the directional spool 53 is moved upwardly to place the central portion 56 of the spool in radial alinement with the ports 52.

Referring once again to Figs. 4 to 7, inclusive, a pilot spool chamber 63 is formed in the sleeve 64 which is press fitted in the bore 65 of the body member 11. The chamber 63 is in alinement with the chamber 66 in the cap 12. The lower end portion of the pilot spool chamber 63 is sealed against leakage by a plug 67, having a reduced inner end portion 68 extending into the lower end portion of the pilot spool chamber.

The periphery of the sleeve 64 is provided with a series of longitudinally spaced annular grooves 69, 71, 72 and 73. The groove 69 is provided with a port 74 for communication with the lower end portion of the pilot spool chamber 63. The grooves 71 and 72 are provided with ports 75 and 76, respectively, for communication with the central portion of the pilot spool chamber 63. The groove 73 is provided with ports 77 for communication with the upper end portion of the pilot spool chamber 63.

A pilot spool 78 is positioned in the chamber 63 for limited axial movements. The upper end portion 79 and the lower end portion 81 of the pilot spool 78 are of equal length and are closely fitted into the chamber 63 to provide sealing contact therewith. Immediately above the lower end portion 81, the diameter of the pilot spool 78 is reduced for a relatively short portion to form an annular groove 82. A groove 83, of less axial length than the groove 82, is formed inwardly of the upper end portion 79 by a reduction in the diameter of the spool. The center portion of the pilot spool 78 is of reduced diameter is provide an annular groove 84. The arrangement of the grooves 82, 83 and 84 is such as to provide a sealing surface 85 of a given length between the groove 82 and 84 and a sealing surface 86 of a slightly greater length between the grooves 83 and 84. The inner surface of the sleeve 64 is provided with an annular groove 87 in line with the ports 77 and of slightly greater width than the diameter of the ports.

It will be appreciated that, since the upper end portion 54 and the lower end portion 55 of the directional spool 53 are of equal length, the areas of contact with the wall of the chamber 36 at opposite ends of the spool are equal. Similarly, the sum of the lengths of the upper end portion 79 and sealing surface 86 at one end of the pilot spool 78 is substantially equal to the sum of the lengths of the lower end portion 81 and sealing surface 85 at the other end of the spool. This equalization of contact surface facilitates lapping of a true cylinder to provide a true, free, and oiltight lap fit of the spools 53 and 78 in their respective chambers 36 and 63. In the absence of such equalization of surfaces, the cylindrical surface is customarily tapered during the lapping operation.

The pilot spool 78 is provided with an axially arranged passageway 88 extending from its lower end to a point radially inwardly of the groove 83. This passageway 88 is provided with lower ports 89 and upper ports 91 for connecting the passageway with the grooves 82 and 83, respectively. The passageway 88 and upper and lower ports 89 and 91 provide constant communication between the lower end portion of the pilot spool chamber 63 and the grooves 82 and 83.

The upper end of the pilot spool 78 is provided with a projection 92. A hollow cup 93 is loosely positioned over the projection 92 and is provided with a flange 94 for engaging a spring 95 compressed between it and the top wall of the chamber 66. A port 96, having a pipe 97 threadedly connected thereto, acts to drain from chamber 66 any fluid which may accumulate therein.

Referring now to Fig. 7, it will be seen that groove 69 is in constant communication with the lower end portion of the pilot spool chamber 63 through the port 74. The groove 71 is in communication with the groove 84 through the ports 75 only when the pilot spool 78 is in its lowermost position. When the pilot spool 78 moves upwardly, the ports 75 are first closed by the sealing surface 85 and upon further movement of the pilot spool the groove 82 comes into alinement with the ports 75 so that the groove 71 is in communication through the ports 75, the groove 82, the ports 89 and the passageway 88 with the lower end portion of the pilot spool chamber 63. The groove 72 is in communication with the groove 84 through the ports 76 throughout the limited movement of the pilot spool 78. The groove 73 is in communication with the groove 83 through the ports 77 and groove 87 when the pilot spool is in its lowermost position. As the pilot spool moves upwardly, the groove 87 is covered by the sealing surface 86. Upon further movement of the pilot spool 78, the groove 87 is opened to the groove 84 in the pilot spool so that groove 73 is in communication with the lower end portion of the pilot spool chamber 63 through the ports 75, groove 87, ports 91 and passageway 88.

Upon movement of the pilot spool 78 from its lowermost to its uppermost position, the sequence of opening and closing of ports 75 and 77 will occur as follows:

First, the ports 75 are completely closed by the sealing surface 85 while the ports 77 are kept open by the groove 87. The groove 87 is next closed by the sealing surface 86, at which time both the ports 77 and 75 are closed. Subsequently, the ports 75 are opened to the groove 82 while the groove 87 remains closed. Finally, the pilot spool 78 moves into its uppermost position where the ports 77 are opened to the groove 84 through the groove 87 and the ports 75 are opened to the groove 82.

The sequence in which the ports 75 and 77 are opened and closed during the return movement of the pilot spool 78 will occur as follows:

First, the groove 87 is closed by the sealing surface 86 while the ports 75 remain open to provide communication between the grooves 71 and 82. Next, the ports 75 are closed by the sealing surface 85 while the groove 87 is still closed. Subsequently, groove 87 is opened to provide communication between the grooves 83 and 73 through ports 77 while the ports 75 remain closed. Finally, the ports 75 are opened to provide communication between the grooves 71 and 84 while the ports 77 remain open to provide communication between the grooves 83 and 73.

By referring to Figs. 4, 5 and 7, it will be seen that the body member 11 is provided with a passageway 98 connecting groove 45 with the groove 71, a passageway 99 connecting groove 69 with the groove 46, a passageway 101 connecting groove 48 with the groove 72, and a passageway 102 connecting groove 73 with the chamber 39 in the cap 12.

Referring now to Fig. 8 for a detail description of the schematic illustration of the unloading valve, disclosed in detail in Figs. 1 to 7, inclusive, and its relationship with a typical pressure fluid power transmission system, reference character 11a designates a body member which is the equivalent of the body member 11, cap 12, plugs 25 and 67, cap screws 33 and 43 and sleeves 37 and 64 of Figs. 1 to 7, inclusive. The body member 11a is provided with an inlet port 16a connected to the pipe 17 for providing a flow path for the pressure fluid from the pump 103. A pipe 104 provides communication between the inlet to the pump 103 and the fluid reservoir or sump 105.

The body member 11a also is provided with a pressure outlet port 18a and a by-pass outlet port 19a. The pressure outlet port 18a is connected to the pipe 21 providing fluid communication with an accumulator 106 which receives fluid from the pump 103 for delivery through pipe 107 to the work-performing portion of the pressure fluid power transmission system. The by-pass outlet port 19a is connected to the pipe 22 which provides fluid communication with the tank 105 that is substantially at atmospheric pressure.

A passageway 23a, functionally corresponding to the passageway 23, branch passage 24, groove 47 and ports 51 of the unloading valve of Figs. 1 to 7, inclusive, provides communication from the inlet port 16a to the interior of the valve body and to a chamber 26a. A check valve 28a is positioned in the chamber 25a and is caused to engage the tapered seating surface 27a by the spring 32a.

A branch passage 35a, corresponding to the branch passage 35 and groove 46 of the valve illustrated in Figs. 1 to 7, inclusive, provides communication between the chamber 26a and the pressure outlet port 18a. The body member 11a is provided with a directional spool chamber 36a and a chamber 39a corresponding to the chambers 36 and 39, respectively, of the valve of Figs. 1 to 7, inclusive.

The directional spool 53, cap 59 and spring 61 are positioned in the chambers 36a and 39a. These elements are identical to those illustrated in Figs. 1 to 7, inclusive, and corresponding reference characters have been used to indicate like portions of the same.

The inner end of the passageway 23a opens into the directional spool chamber 36a in alinement with the central, reduced portion 56 of the directional spool. A passageway 48a, corresponding to the groove 48 and ports 52 of Figs. 1 to 7, inclusive, provides communication between the by-pass outlet port 19a and the directional spool chamber 36a.

The body member 11a is provided with a pilot spool chamber 63a and a chamber 66a, corresponding to the chambers 63 and 66 of Figs. 1 to 7, inclusive. The pilot spool 78, cap 93 and spring 95 are positioned in the chambers 63a and 66a. These elements are identical to the similarly numbered elements of Figs. 1 to 7, inclusive. The chamber 66a is provided with a drain 96a connected to a pipe 97 for communication with the tank 105.

Passageway 99a in the body member 11a functionally corresponds to the passageway 99, groove 69 and port 74 of Figs. 1 to 7, inclusive, while passageway 98a corresponds to the port 49, groove 45, passageway 98, groove 71 and port 75, and passageway 101a corresponds to the passageway 101, groove 72 and port 76. Also, passageway 102a corresponds to the passageway 102, groove 73 and ports 77 of Figs. 1 to 7, inclusive.

For greater clarity, it is believed the operation of the unloading valve of this invention can best be described in connection with the schematic illustration of Fig. 8.

In describing the operation of the unloading valve, it will be assumed that at the start of the initial loading cycle no pressure exists in the accumulator 106. The directional spool 53 and the pilot valve spool 78 will, therefore, be held in their lowermost positions by the springs 61 and 95, respectively, and the check valve member 28a will be seated against the surface 27a by the relatively light spring 32a.

As the pump 103 begins to operate, fluid is drawn from tank 105 through the pipe 104 and forced through the pipe 17 and the inlet port 16a into the passageway 23a. Since the directional spool 53 is in its lowermost position, no outlet for the fluid is provided through the directional spool chamber 36a to the passageway 48a. Sufficient pressure, therefore, is developed in the passageway 23a to unseat check valve 28a and the fluid will flow through the chamber 26a and passageway 35a to the pressure outlet port 18a and thence through the pipe 21 to the accumulator 106.

The accumulator stores the fluid received from the unloading valve at a gradually increasing pressure which acts through the passageway 99a on the lower end surface of the pilot spool 78. This accumulator pressure also acts through the passageway 88, the ports 91 in the pilot spool, the passageway 102a and the chamber 39a to supplement the force exerted by the spring 61 for holding the directional spool 53 in its lowermost position. At this time, the lower end portion of the directional spool 53 is subjected, by way of the passageway 98a, the pilot spool chamber 63a, the passageway 101a and the passageway 48a, to the pressure in the outlet port 19a which is substantially atmospheric.

It will be noted that the rising accumulator pressure which exists in the chamber 39a and the substantially atmospheric pressure which exists at the lower end portion of the directional spool 53 create a pressure differential which will hold the spool in its lowermost position.

The rising pressure in the accumulator 106, acting on the lower end portion of the pilot spool 78 against the pressure of the spring 95, will effect a gradual upward movement of this spool as the spring is compressed. This upward movement of the pilot spool 78 causes the sealing surface 85 to close one end of the passageway 98a. A continued rise in the pressure in the accumulator 106 causes the sealing surface 86 to close the passageway 102a. At this time the differential pressure acting on the opposite ends of the directional spool 53 remains unchanged and no movement will have been imparted to the directional spool.

A still further rise in the pressure in the accumulator 106 will cause the sealing surface 85 to move past the passageway 98a so that the pressure fluid in the accumulator will flow through the passageway 88, the ports 89 and the passageway 98a to the lower end portion of the directional spool chamber where it will exert an upward force on the lower end surface of the directional spool 53. The fluid in the chamber 39a, however, is confined therein by the sealing surface 86 and will prevent the directional spool 53 from moving in an upward direction.

A still further increase of the pressure in the accumulator 106 will cause the sealing surface 86 of the pilot spool to be moved beyond the passageway 102a so that the pressure in the chamber 39a will be reduced to atmospheric by flow of fluid through the passageway 102a, the pilot spool chamber 63a, the passageway 101a and the passageway 48a. At this point in the operation of the unloading valve, the accumulator pressure, which is still applied to the lower end of the directional spool 53, will act to impart upward movement to this spool so that the passageway 23a is placed in communication with the passageway 48a as a result of the upward movement of the spool end portion 54. This will result in an immediate drop in pressure in the passageway 23a whereupon the check valve 28a will be seated against the surface 27a by the pressure in the accumulator 106 and the spring 32a.

The upward movement of the pilot spool 78, to bring about the above described unloading cycle, is controlled by the pressure of the spring 95 which is so calibrated that movement of the pilot spool 78 will be controlled to prevent a change in the position of the directional spool 53 before the pressure in the accumulator 106 has reached the desired maximum operating pressure.

It will be appreciated that after the completion of the previously discussed cycle the unloading valve will operate to cause the fluid entering the inlet port 16a to flow out through the by-pass outlet port 19a for return to the tank 105 with no back pressure being exerted against the flow of the fluid other than that due to pipe friction. It, also, will be appreciated that the relatively high fluid pressure in the accumulator 106 will act upon the lower end portion of the directional spool 53 to maintain this spool in its uppermost position.

The directional spool 53 will remain in its uppermost position until enough fluid has been delivered to the work-performing portion of the circuit to reduce the fluid pressure in the accumulator 106 to a minimum operating pressure. As the fluid pressure in the accumulator 106 is reduced, the pressure acting on the bottom end surface of the pilot spool 78 also is reduced and the pressure exerted by the spring 95 will eventually effect downward movement to the pilot spool. As the pilot spool 78 moves downwardly, the sealing surface 86 will be moved to cover the end of the passageway 102a. At this point the pressure differential applied to the opposite ends of the directional spool 53 will be unchanged and this spool will remain in its uppermost position.

Further reduction of the fluid pressure in the accumulator 106 will cause further downward movement of the pilot spool 78 so that the sealing surface 85 will be moved to cover the passageway 98a. The sealing surface 85 then will confine the fluid in the lower portion of the directional spool chamber 36a so that no downward movement of the directional spool 53 can occur.

A further drop in the fluid pressure in the accumulator 106 will produce further downward movement of the pilot spool 78 to cause the sealing surface 86 to move past the passageway 102a at which time the accumulator pressure will act through the passageway 88, the ports 91, the passageway 102a and the chamber 39a to apply a downwardly directed force on the upper end surface of the directional spool 53. At this point, however, the fluid in the lower portion of the chamber 36a is still confined by the sealing surface 85 so that no downward movement of the directional spool 53 may occur.

When the fluid pressure in the accumulator 106 has dropped to a minimum operating pressure the pilot spool 78 will have moved downwardly to its lowermost position at which time the sealing surface 85 will have moved past the passageway 98a to reduce the pressure in the lower portion of the directional spool chamber 36a to atmospheric pressure as a result of fluid flow through the passageway 99a, the pilot valve chamber 63a, the passageway 101a, and the passageway 48a. At this time, the previously applied fluid pressure in the chamber 39a will cause downward movement of the directional spool 53 to close communication between the passageways 23a and 48a. Fluid entering the valve from the pump 103 will, therefore, be forced to flow past the check valve member 28a and into the accumulator 106 to replenish the supply and raise the pressure of the fluid in the accumulator to its maximum operating pressure.

The drain 96a in chamber 66a merely provides for the return to tank 105 any fluid leaking past the pilot spool 78 into the chamber 66a.

It will be appreciated that by proper calibration of the spring 95 the range between the maximum and minimum operating pressures may be varied to meet the specific requirements of any particular fluid pressure power transmission system.

It is to be understood that the form of the invention herewith shown and described is to be taken as a preferred example of the same, and that various changes in the shape, size, and arrangement of the parts may be resorted to without departing from the spirit of the invention or the scope of the subjoined claims.

Having thus described the invention, I claim:

1. An unloading valve, comprising a body member having an inlet port in open communication with a continuous source of pumped pressure fluid, an outlet port in open communication with an accumulator for said pressure fluid, an outlet port connected to a pump fluid supply tank at atmospheric pressure, a directional spool chamber communicating with said inlet port and supply tank outlet port, a pilot spool chamber having one end in open communication with said accumulator outlet port, first and second passageways connecting the opposite end portions of said directional spool chamber to said pilot spool chamber, and a third passageway continuously connecting said supply tank outlet port with said pilot spool chamber intermediate said first and second passageway connections; a check valve preventing reverse flow of fluid from the accumulator to the inlet port, a directional spool positioned in its chamber and movable by the selective application of accumulator fluid pressure and fluid supply tank pressure to its opposite ends to establish and interrupt an unloading connection between said inlet port and said supply tank outlet port, a pilot spool positioned in its chamber with one entire end face constantly exposed to the accumulator fluid pressure prevailing in said one end of the chamber, a spring acting on the pilot spool to oppose the force of the accumulator fluid pressure, said spring being calibrated to effect, in cooperation with said accumulator fluid pressure, gradual movement of said pilot spool in opposite directions as the accumulator fluid pressure varies between preselected minimum and maximum pressure values, said pilot spool having an axial passageway opening through its end face which is exposed to the accumulator pressure and three longitudinally spaced peripheral grooves, the outer two of said grooves being in open communication with said axial passageway and being spaced to alternately register with said first and second passageways when the pilot spool occupies the opposite end positions of its path of travel, and the intermediate groove being of sufficient width to register with said third passageway at all positions occupied by the pilot spool and to also register alternately, but in the reverse order to said outer grooves, with said first and second passageways when the pilot spool occupies the opposite end positions of its path of travel.

2. An unloading valve as defined in claim 1, further characterized by the said three grooves being spaced to form therebetween two peripheral surfaces of sufficient width and relative location to simultaneously seal both of said first and second passageways while the pilot spool is moving a substantial portion of the distance between its opposite end positions, so that the directional spool will be moved in opposite directions to establish and interrupt said unloading connection only as the maximum and minimum pressure values are attained in the accumulator.

3. An unloading valve as defined in claim 2, further characterized by the individual widths of the sealing surface and the adjacent end of the outer passageway at one end of the pilot spool being sufficiently greater than the corresponding widths of the sealing surface and the adjacent end of the outer passageway at the other end of the pilot to cause, during movement of the pilot spool in either direction, the outer groove at the trailing end of the pilot spool to register with its respective one of said first and second passageways prior to the registering of the intermediate groove with the other of said first and second passageways, whereby the application of the accumulator fluid pressure to either end of the directional spool will precede the release of the accumulator fluid pressure from the other end of the directional spool.

4. An unloading valve, comprising a body member having an inlet port in open communication with a continuous source of pumped pressure fluid, an outlet port in open communication with an accumulator for said pressure fluid, an outlet port connected to a pump fluid supply tank at atmospheric pressure, a directional spool chamber communicating with said inlet port and said supply tank outlet port at longitudinally spaced locations, a pilot spool chamber having one end in open communication with said accumulator outlet port, first and second passageways connecting the opposite end portions of said directional spool chamber to spaced portions of said pilot spool chamber, and a third passageway connecting the intermediate portion of the directional spool chamber at said supply tank outlet port location with a portion of said pilot spool chamber intermediate said spaced portions; a check valve preventing reverse flow of fluid from the accumulator to the inlet port, a directional spool positioned in its chamber and movable in opposite directions to establish and interrupt an unloading connection between said inlet port and said supply tank outlet port when the accumulator fluid pressure is applied alternately to one or the other of its opposite ends and the end portion of the chamber associated with the other end of the directional spool is connected to the supply tank outlet port, a pilot spool positioned in its chamber with one entire end face constantly exposed to the accumulator fluid pressure prevailing in said one end of the chamber, a spring acting on the pilot spool to oppose the force of the accumulator fluid pressure, said spring being calibrated to permit movement of the pilot spool by the accumulator fluid pressure after said pressure reaches a certain minimum value and, in cooperation with said accumulator fluid pressure, to effect gradual movement of said pilot spool in opposite directions as the accumulator fluid pressure varies between said minimum pressure value and a certain maximum pressure value, said pilot spool having an axial passageway opening through its end face which is exposed to the accumulator pressure and three longitudinally spaced peripheral grooves, the outer two of said grooves being in open communication with said axial passageway and being spaced to alternately register with said first and second passageways when the pilot spool occupies the opposite end positions of its path of travel, and the intermediate groove being of sufficient width to register with said third passageway at all positions occupied by the pilot spool and to also register alternately, but in the reverse order to said outer grooves, with said first and second passageways when the pilot spool occupies the opposite end positions of the path of travel.

FRANK J. STRNAD.

References Cited in the file of this patent

UNITED STATES PATENTS

| Number | Name | Date |
| --- | --- | --- |
| 2,316,445 | Marshall | Apr. 13, 1943 |
| 2,447,820 | Schultz | Aug. 24, 1948 |
| 2,474,122 | Schneck | June 21, 1949 |
| 2,513,681 | Schultz | July 4, 1950 |
| 2,545,712 | Stevenson | Mar. 20, 1951 |

FOREIGN PATENTS

| Number | Country | Date |
| --- | --- | --- |
| 589,644 | Great Britain | Dec. 23, 1942 |